United States Patent
Futhey et al.

(10) Patent No.: US 6,612,723 B2
(45) Date of Patent: Sep. 2, 2003

(54) LUMINAIRE SYSTEM

(75) Inventors: John A. Futhey, Santa Rosa, CA (US); William P. Rowland, Southington, CT (US)

(73) Assignee: Reflexite Corporation, Avon, CT (US)

(*) Notice: Subject to any disclaimer, the term of this patent is extended or adjusted under 35 U.S.C. 154(b) by 0 days.

(21) Appl. No.: 09/725,338

(22) Filed: Nov. 29, 2000

(65) Prior Publication Data

US 2001/0030857 A1 Oct. 18, 2001

Related U.S. Application Data

(60) Provisional application No. 60/168,084, filed on Nov. 30, 1999.

(51) Int. Cl.[7] .................................................. F21V 5/02
(52) U.S. Cl. .................... 362/339; 362/31; 362/337; 362/338; 362/558
(58) Field of Search .................... 362/31, 651, 558, 362/336, 337, 338, 339, 340; 385/146

(56) References Cited

U.S. PATENT DOCUMENTS

| | | | |
|---|---|---|---|
| 3,234,376 A | 2/1966 | Ceglia | 240/106 |
| 4,422,719 A | 12/1983 | Orcutt | 350/96.3 |
| 4,466,697 A | 8/1984 | Daniel | 350/96.3 |
| 4,644,454 A | 2/1987 | Herst et al. | 362/224 |
| 4,805,984 A | 2/1989 | Cobb, Jr. | 350/96.28 |
| 5,126,882 A | 6/1992 | Oe et al. | 359/619 |
| 5,186,530 A | 2/1993 | Whitehead | 362/31 |
| 5,475,785 A | 12/1995 | Johanson | 385/100 |
| 5,481,637 A * | 1/1996 | Whitehead | 385/125 |
| 5,594,830 A | 1/1997 | Winston et al. | 385/146 |
| 5,745,632 A | 4/1998 | Dreyer | 385/133 |
| 5,845,037 A | 12/1998 | Miekis | 385/136 |
| 5,863,114 A | 1/1999 | Nagatani et al. | 362/328 |
| 5,913,599 A | 6/1999 | Smith et al. | 362/328 |
| 5,949,933 A | 9/1999 | Steiner et al. | 385/36 |
| 6,280,052 B1 | 8/2001 | White | 362/225 |

FOREIGN PATENT DOCUMENTS

| | | |
|---|---|---|
| EP | 0 293 182 A2 | 11/1988 |
| EP | 0 426 433 A2 | 5/1991 |
| EP | 0 528 645 A2 | 2/1993 |
| FR | 1.529.681 | 6/1968 |
| FR | 2 678 758 | 1/1993 |
| JP | 10319244 | 12/1998 |
| WO | WO 80/02735 | 12/1980 |

* cited by examiner

*Primary Examiner*—Sandra O'Shea
*Assistant Examiner*—John Anthony Ward
(74) *Attorney, Agent, or Firm*—Hamilton, Brook, Smith & Reynolds, P.C.

(57) ABSTRACT

A luminaire and method are provided comprising a light source, a plurality of prisms, such as linear prisms, for redirecting light from the light source in a predetermined direction, and a reflector for redirecting light from the light source toward the plurality of prisms. Each of the linear prisms has a longitudinal axis and the light source has a longitudinal axis, wherein the longitudinal axes of the linear prisms are substantially parallel to the longitudinal axis of the light source. Each of the plurality of prisms has an included angle, which can vary as a function of the distance from the light source. The angle can vary stepwise or continuously. In one embodiment, each of the plurality of prisms adjacent the light guide has an included angle in the range of between about 35 and 45 degrees. In another embodiment, the included angle is substantially uniform among the prisms. The luminaire optical sheet can be made out of continuous sheet with built in hinge points to provide a complete light redirecting structure.

35 Claims, 4 Drawing Sheets

LUMINAIRE SYSTEM

RELATED APPLICATION

This application claims the benefit of U.S. Application No. 60/168,084, filed Nov. 30, 1999, the entire teachings of which are incorporated herein by reference.

BACKGROUND OF THE INVENTION

A luminaire generally includes a light source, such as a fluorescent bulb, radiating into a light guide which directs the light in a predetermined direction, such as downward. These luminaires are used to provide a more uniform light distribution than conventional light systems and alleviate glare in applications such as office space, boardrooms, and customer service centers.

SUMMARY OF THE INVENTION

Prior art luminaires have centered light in front of the light guide which causes specific areas of high brightness. This high brightness area causes glare as the light reflects from shiny surfaces such as magazine pages, computer screens, table tops, etc. Large reflective baffles have been used to reflect light into a specific distribution pattern but the bright image of the bulb is still present creating intense glare. Textured panels or structured panels have been used to hide or mask the bulb image. However, these prior art systems have not been effective in hiding the bulb image or in effectively controlling the light distribution.

A need exists, therefore, for a luminaire that effectively hides the bulb image, creates well defined light distributions, is light weight relative to solid optical waveguides, and which can be inexpensively produced.

A luminaire and method are provided, in one embodiment, comprising a light source, a plurality of prisms, such as linear prisms, for redirecting light from the light source in a predetermined direction, and a reflector for redirecting light from the light source toward the plurality of prisms.

In one embodiment, each of the linear prisms has a longitudinal axis and the light source has a longitudinal axis, the longitudinal axes of the linear prisms being substantially parallel to the longitudinal axis of the light source.

Each of the plurality of prisms has an included angle, which can vary as a function of the distance from the light source. For example, the angle can vary stepwise or continuously. In one embodiment, each of the plurality of prisms adjacent the light guide has an included angle in the range of between about 35 and 45 degrees. In another embodiment, the included angle is substantially uniform among the prisms.

In one embodiment, the plurality of prisms are substantially horizontal and the reflector is angled with respect to a horizontal plane. The plurality of prisms can be configured so as to form a curve.

A luminaire is also provided which includes a light source, a light guide that receives light radiating from the light source, a plurality of prisms adjacent the light guide for redirecting the light from the light guide substantially perpendicular to a longitudinal axis of the light guide, and a plurality of prisms adjacent the light source that control the spreading of light along the longitudinal axis of the light guide. In one embodiment, the light guide is triangular shaped. In another embodiment, the light guide is rectangular shaped.

A redirecting device can be positioned adjacent the light source for redirecting light rays into the light guide. The longitudinal axis of the luminaire can be tipped relative to a horizontal plane.

The luminaire can include the plurality of prisms adjacent the light guide spaced apart from one another. In one embodiment, the plurality of prisms are spaced about 0.51 millimeters (0.020 inches) apart. In another embodiment, the plurality of prisms are spaced apart in the range of between about 0.025 and 3.175 millimeters (0.001 and 0.125 inches).

A luminaire is further provided which includes a light source, a light guide that receives light radiating from the light source, and a plurality of prisms adjacent the light guide that redirect the light from the light guide substantially perpendicular to a longitudinal axis of the light guide. In one embodiment, the prisms are formed from a single sheet of material into an integral tube.

The luminaire can further include a plurality of prisms adjacent the light source to control the spreading of light along the longitudinal axis of the light guide. Bending grooves or surfaces, for example, living hinges, can be provided in the sheet of material for forming the tube. The tube can include a reflective surface on an inside, end surface to prevent the light rays from leaving through the end of the light guide.

A closed rectangular, triangular, or any polygon cross-section optical tube can also be formed by providing appropriate bending grooves or surfaces.

Figure 1:
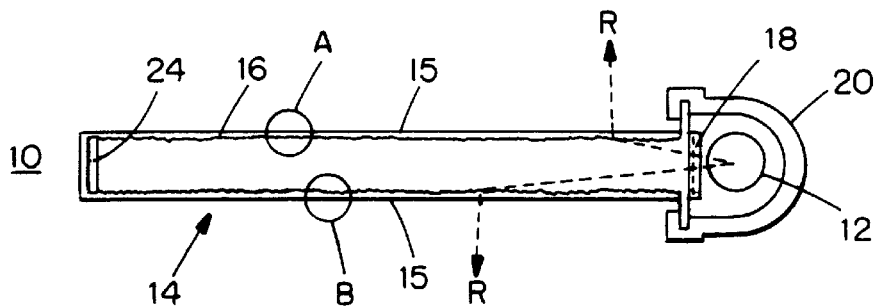
FIG. 1 illustrates a cross-sectional view of a luminaire in accordance with an embodiment of the present invention.

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows. FIG. 1 illustrates a cross sectional view of an embodiment of a luminaire system, generally designated as reference numeral 10, which can be used for collimating light for an overhead light display or the like.

The luminaire 10 includes a light source 12, such as a fluorescent cylindrical bulb, that produces light rays R, which are redirected by prisms 16 positioned on the inside of a waveguide or light guide 14 in a desired direction, such as substantially perpendicular to the waveguide. Preferably, the light intensity along the exit surfaces 15 of the waveguide 14 is substantially uniform. In one embodiment, the waveguide 14 is rectangular shaped. Each prism structure 16 is designed with an angle which redirects the majority of the light rays R in the desired direction by reflection, total internal reflection, and refraction.

A redirecting device 20, such as a curved mirror or aluminum reflector, is positioned adjacent the light source 12 to direct the light rays into the end of the waveguide 14. A plurality of prisms 18 or other suitable mechanism, such as a lens, can be provided adjacent the light source 12 to control the lengthwise spreading of the light rays along the longitudinal axis of the waveguide 14. The prisms 18 of any of the embodiments disclosed herein can be vertically oriented as shown in FIG. 1 or alternatively, oriented 90 degrees such that the prisms 18 are running in a substantial horizontal direction. In alternative embodiments, the prisms can be oriented in any direction.

The waveguide 14 can be constructed from a polycarbonate material, acrylic, or other suitable material, such as disclosed in U.S. Pat. No. 5,396,350, issued to Beeson et al. on Mar. 7, 1995, the teachings of which are incorporated herein by reference.

Figure 2:
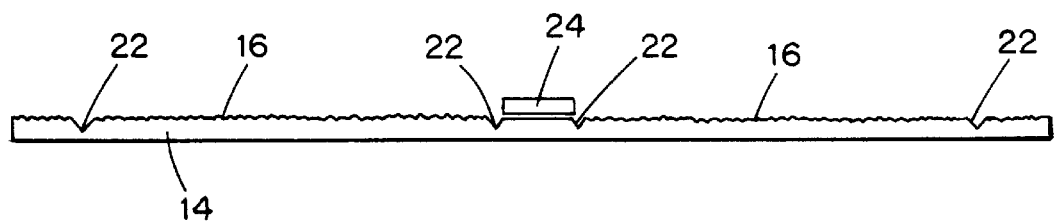
FIG. 2 illustrates a cross-sectional view of the waveguide shown in FIG. 1 prior to being formed into a U-shaped tube.

Preferably, the waveguide 14 is constructed from an extrusion embossed sheet or cast sheet which includes the prism structures 16 formed, embossed, or cast on one side. As shown in FIG. 2, bending grooves 22 are provided to allow the waveguide 14 to be formed, by thermoforming or in the case of polycarbonate cold formed, to form a three sided tube. The tube can be, for example, U-shaped, rectangular-shaped, polygon-shaped, or triangular-shaped. The bending grooves 22 can, for example, be V-shaped or U-shaped, and form a living hinge. In one embodiment, the end portions of the sheet can form the prisms 18. In a preferred embodiment, the sheet has a thickness in the range of about 0.635 to about 1.27 millimeters (0.025 to about 0.050 inches).

Alternatively, the waveguide tube can be extruded as the U-shaped tube with the prisms 16 formed on the inner surfaces. In another embodiment, a rectangular tube can be extruded with the linear prisms 16 formed inside. An end of the rectangular tube can be removed, by machining or otherwise, to leave the preferably shaped waveguide 14. In yet another embodiment, the flat sheet illustrated in FIG. 2 can be compression molded the same way a large Fresnel lens is made. The piece can then be thermoformed or cold formed to the finished shape.

A reflective device 24, such as cement metalized polyester (PET) or polished aluminum, is provided at the end of the waveguide 14 to ensure that light rays R do not exit through the distal end of the waveguide. Alternatively, in place of the reflective device 24, the flat surface can be patterned metalized.

Figure 3:
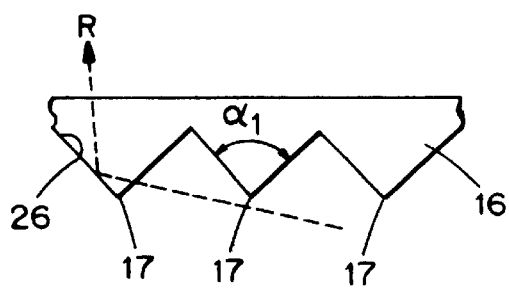
FIG. 3 is an enlarged view of area "A" of FIG. 1 particularly illustrating the linear prisms.
Figure 4:
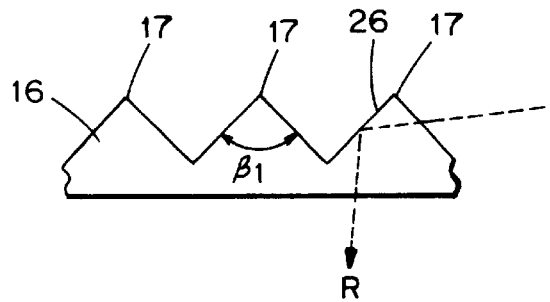
FIG. 4 is an enlarged view of area "B" of FIG. 1 particularly illustrating the linear prisms.

FIG. 3 illustrates an enlarged view of area "A" of FIG. 1, wherein the linear prisms 16 are shown in detail. Angle $\alpha_1$ can vary along the waveguide to cause the light rays R to be uniformly distributed along the exit surfaces 15. More particularly, angle $\alpha_1$ can change, for example, continuously or stepwise, along the length of the waveguide 14 to provide a varying angled reflecting surface 26 for the light rays. Similarly, the bottom surface of the waveguide 14, as illustrated in FIG. 4, can include an angle $\beta_1$ which varies along the length of the waveguide. The prisms can be designed to meet photometric requirements. In one embodiment, angle $\alpha_1$ is approximately 90 degrees while angle $\beta_1$ is approximately 70 degrees. In other embodiments, angle $\alpha_1$ and angle $\beta_1$ are the same and can vary equally along the length of the waveguide 14. In one embodiment, the distance between prism apices 17 is between about 0.025 and 3.175 millimeters (0.001 and 0.125 inches).

The linear prisms 16 can include different shapes, such as saw-toothed, polygon, or curved. The prisms 16 can also include flats or curved tips or valleys to help control the light rays R.

Figure 5:
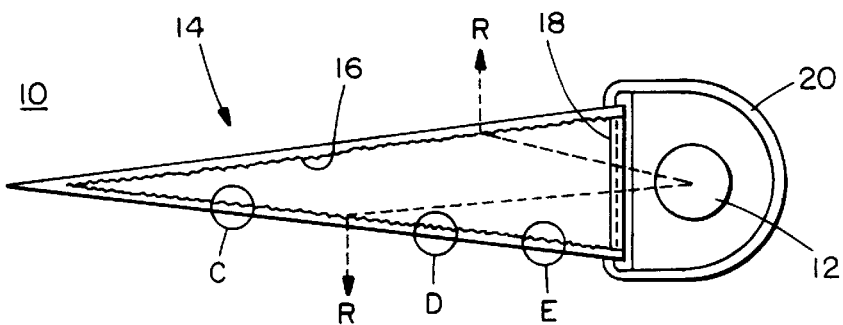
FIG. 5 illustrates a cross-sectional view of a luminaire in accordance with another embodiment of the present invention.
Figure 6:
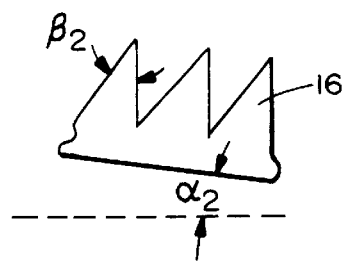
FIG. 6 is an enlarged view of area "C" of FIG. 5 particularly illustrating the linear prisms in accordance with an embodiment of the present invention.
Figure 7:
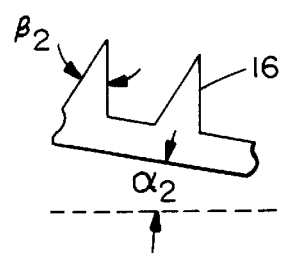
FIG. 7 is an enlarged view of area "C" of FIG. 5 particularly illustrating the linear prisms in accordance with another embodiment of the present invention.

FIG. 5 illustrates another embodiment of luminaire 10 which includes a triangular shaped waveguide 14. FIGS. 6 and 7 are enlarged, alternative views of area "C" of FIG. 5. Angle $\alpha_2$, which is measured from a horizontal plane, is approximately 10 degrees. In one embodiment, angle $\beta_2$ is approximately 45 degrees. The prisms can have a groove to peak height of between about 0.1 and 1.0 millimeters. The prisms of FIG. 6 are configured relatively close to one another while the prisms of FIG. 7 are spaced apart from one another. In a preferred embodiment, the prisms are pitched approximately 0.51 millimeters (0.020 inches) apart. With the prisms that are spaced apart as shown in FIG. 7, the distance d can be in the range of between 0.1 and 1.0 millimeters. In one embodiment, the distance is about 0.5 millimeters.

Figure 8:
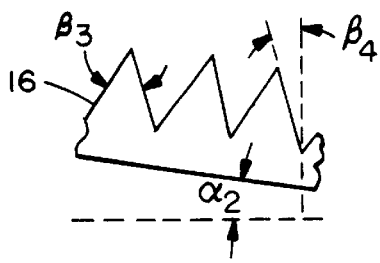
FIG. 8 is an enlarged view of area "D" of FIG. 5 particularly illustrating the linear prisms in accordance with an embodiment of the present invention.
Figure 9:
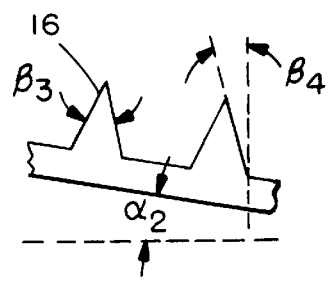
FIG. 9 is an enlarged view of area "D" of FIG. 5 particularly illustrating the linear prisms in accordance with another embodiment of the present invention.

FIGS. 8 and 9 are enlarged, alternative views of area "D" of FIG. 5. In this area, angle $\beta_3$ is approximately 40 degrees. Angle $\beta_4$, which is measured from a vertical plane, is approximately 10 degrees. The prisms can have a groove to peak height of between about 0.1 and 1.0 millimeters. The prisms of FIG. 8 are configured relatively close to one another while the prisms of FIG. 9 are spaced apart from one another. With the prisms that are spaced apart, the distance d can be in the range of between about 0.1 and 1.0 millimeters. In one embodiment, the distance is about 0.5 millimeters.

Figure 10:
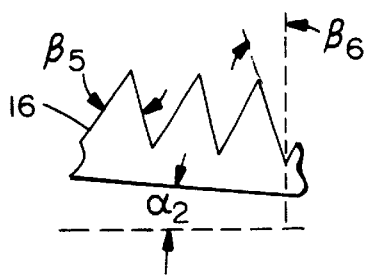
FIG. 10 is an enlarged view of area "E" of FIG. 5 particularly illustrating the linear prisms in accordance with an embodiment of the present invention.
Figure 11:
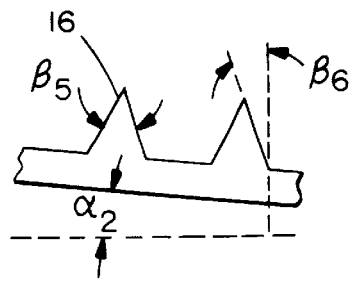
FIG. 11 is an enlarged view of area "E" of FIG. 5 particularly illustrating the linear prisms in accordance with another embodiment of the present invention.

FIGS. 10 and 11 are enlarged, alternative view of area "E" of FIG. 5. In this area, angle $\beta_5$ is approximately 35 degrees. Angle $\beta_6$, which is measured from a vertical plane, is approximately 10 degrees. The prisms can have a groove to peak height of between about 0.1 and 1.0 millimeters. The prisms of FIG. 10 are configured relatively close to one another while the prisms of FIG. 11 are spaced apart from one another. With the prisms that are spaced apart, the distance d can be in the range of between about 0.1 and 1.0 millimeters. In one embodiment, the distance is about 0.5 millimeters.

Figure 12:
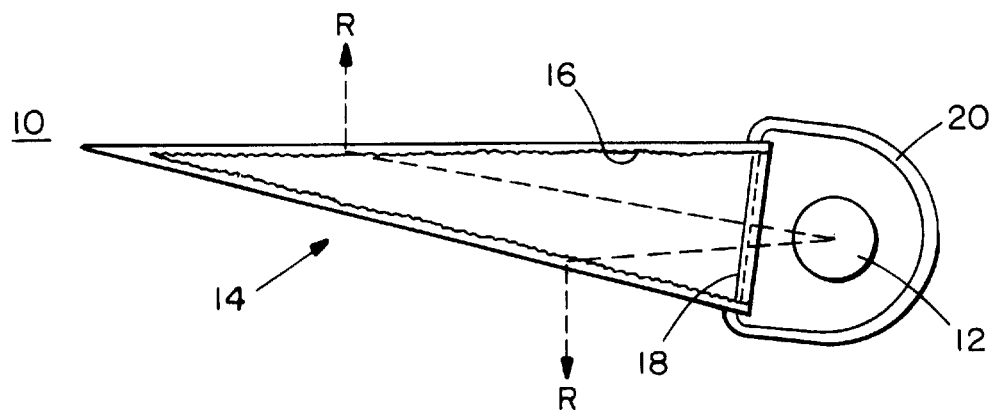
FIG. 12 illustrates a cross-sectional view of a luminaire in which the axis has been tipped relative to the horizontal plane.

FIG. 12 illustrates a luminaire 10 in which the axis has been tipped relative to the horizontal plane. This adjusts the amount of light that is extracted up or down.

Figure 13:
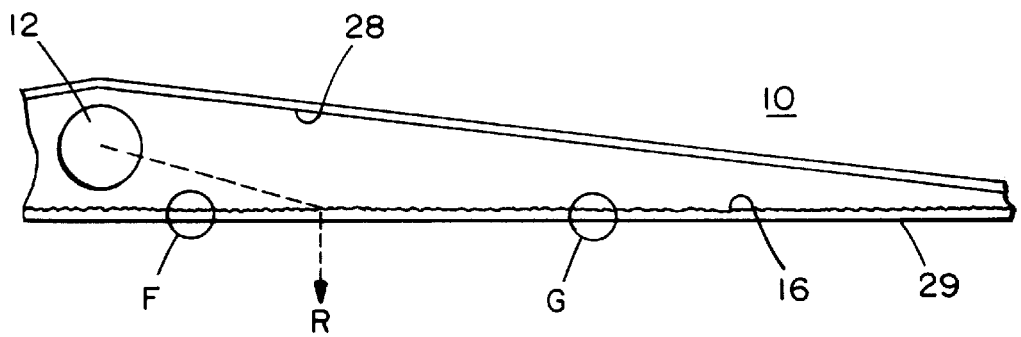
FIG. 13 illustrates a cross-sectional view of a luminaire which redirects light in a desired direction substantially uniformly along the length thereof.

FIG. 13 illustrates a luminaire, waveguide or light extractor 10 which redirects light in a desired direction substantially uniformly along the length thereof. Linear prisms 16 are positioned parallel to the longitudinal axis of the light source 12. A reflector 28, such as a plano mirror, is positioned to reflect light rays R towards prisms 16. In one embodiment, the reflector 28 is positioned at an angle in the range of about 5 to 15 degrees relative to a horizontal plane. The prisms can have a groove to peak height of between about 0.1 and 1.0 millimeters.

Figure 14:
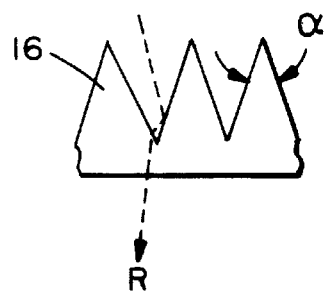
FIG. 14 is an enlarged view of area "F" particularly illustrating the linear prisms in accordance with an embodiment of the present invention.
Figure 15:
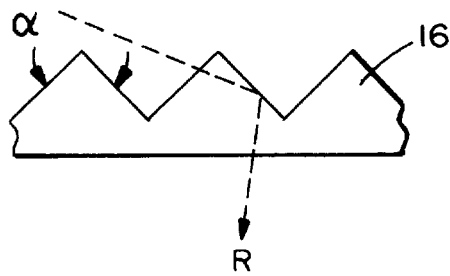
FIG. 15 is an enlarged view of area "G" particularly illustrating the linear prisms in accordance with an embodiment of the present invention.

Preferably, the prisms 16 are not uniform across the extractor 10 to facilitate the necessary angles needed to redirect the light rays R substantially perpendicular to surface 29. FIG. 14, which is an enlarged view of area "F" of FIG. 13, illustrates the prisms 16 nearest the light source 12. FIG. 15, which is an enlarged view of area "G" of FIG. 13, illustrates the prisms 16 distanced away from the light source 12. Prism angle $\alpha$ increases, continuously or in step, the further the prisms are from the light source 12. This compensates for the decreasing entrance angle of the light rays R thereby ensuring that the exiting light ray R is substantially perpendicular to surface 29.

Figure 16:
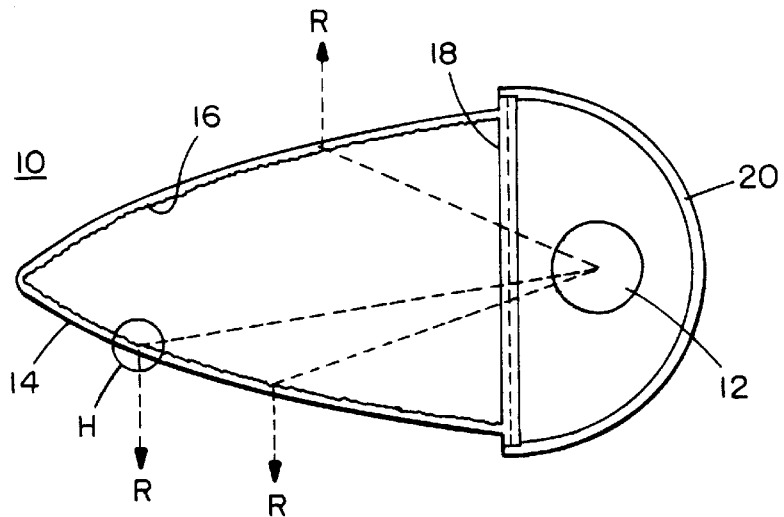
FIG. 16 is a cross-sectional view of an alternative embodiment of a luminaire that redirects light rays from a light source in a desired direction.
Figure 17:
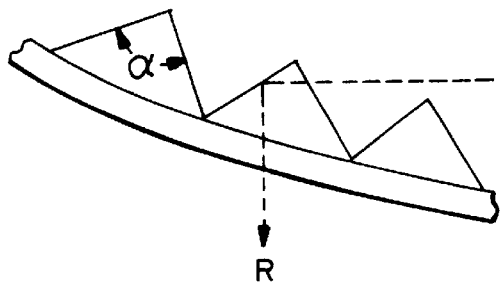
FIG. 17 is an enlarged view of area "H" particularly illustrating the linear prisms in accordance with an embodiment of the present invention.

FIG. 16 illustrates an alternative embodiment of a luminaire or light extractor 10 that redirects light rays R from light source 10 substantially vertically up and down. In this embodiment, the prisms 16 have substantially the same prism angle a while the waveguide 14 configuration or shape changes. That is, the waveguide 14 is curved to account for the decreasing entrance angle of the light rays R. FIG. 17 illustrates an enlarged view of area "H" of FIG. 16.

Figure 18:
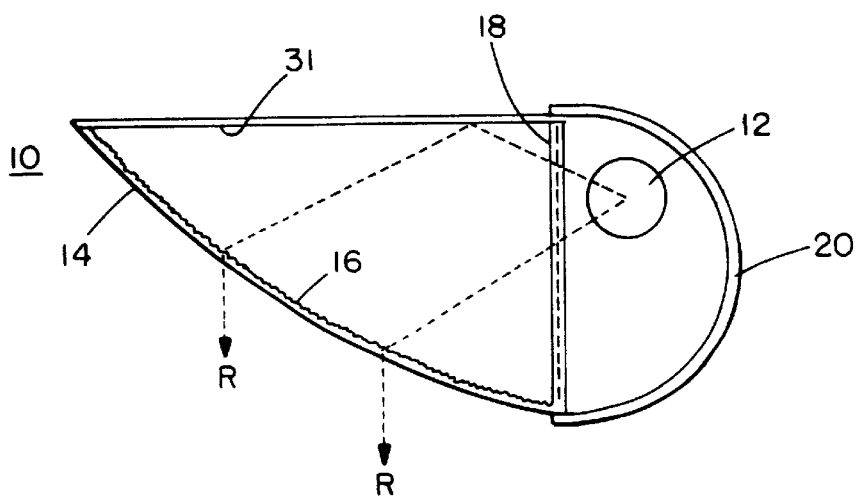
FIG. 18 illustrates a cross-sectional view of an alternative embodiment of a luminaire which redirects light in a substantially single direction.

FIG. 18 illustrates an embodiment of a light extractor 10 similar to the embodiment of FIG. 16. The extractor of FIG. 18 includes a reflecting surface 31 that redirects light rays R toward the prisms 16 such that all the light rays R are redirected substantially vertically downward. Surface 31 can be formed from any suitable specular material, such as aluminum or silver. Such an embodiment is useful for overhead, side-mounted lighting systems. In one embodiment, the distance between prism apices 17 is between about 0.025 and 3.175 millimeters (0.001 and 0.125 inches). The prisms can have a groove to peak height of between about 0.1 and 1.0 millimeters. It is noted that as the index of refraction of the prisms 16 increases, the critical angle at which total internal reflection occurs also increases. Thus, if the index of refraction of the prisms 16 is increased, total internal reflection still occurs at increased prism angles.

In alternative embodiments, any of the prisms disclosed above can be alternating in orientation such that a viewer can see alternating bright and dark lines. For example, the prism arrays can alternate or flip-flop in orientation every few millimeters. The prisms in the arrays are tilted. The number of prisms in a grouping is variable, which includes the width of a group and the size and angle of the prisms. Examples of these embodiments are disclosed in U.S. application Ser. No. 09/726,239, filed on even date herewith, the contents of which are incorporated herein by reference.

While this invention has been particularly shown and described with references to preferred embodiments thereof, it will be understood by those skilled in the art that various changes in form and details may be made therein without departing from the scope of the invention encompassed by the appended claims.

What is claimed is:

1. A luminaire comprising:
    a light source;
    a plurality of prisms for redirecting light from the light source in a predetermined direction, each of the plurality of prisms having an included angle that is substantially uniform along a peak of each prism, the included angle of each prism varying as a function of the distance from the light source; and
    a reflector for redirecting light from the light source toward the plurality of prisms.

2. The luminaire of claim 1 wherein the plurality of prisms include linear prisms.

3. The luminaire of claim 2 wherein each of the linear prisms has a longitudinal axis and the light source has a longitudinal axis, the longitudinal axes of the linear prisms being substantially parallel to the longitudinal axis of the light source.

4. The luminaire of claim 1 wherein the predetermined direction is substantially perpendicular to a light guide formed by the plurality of prisms.

5. The luminaire of claim 1 wherein the included angle varies stepwise or continuously.

6. The luminaire of claim 1 wherein the plurality of prisms are substantially horizontal and the reflector is angled with respect to a horizontal plane.

7. A luminaire comprising:
    a light source;
    a plurality of prisms defining, at least in part, an interior of a hollow light guide for redirecting the light from the light guide substantially perpendicular to a longitudinal axis of the light guide, each of the plurality of prisms having an included angle that is substantially uniform along a peak of each prism, the included angle of each prism varying as a function of the distance from the light source; and
    a plurality of prisms adjacent the light source that control the spreading of light along the longitudinal axis of the light guide.

8. The luminaire of claim 7 further comprising a redirecting device adjacent the light source for redirecting light rays into the light guide.

9. The luminaire of claim 7 wherein the light guide is triangular shaped.

10. The luminaire of claim 7 wherein the plurality of prisms adjacent the light guide are spaced apart from one another.

11. The luminaire of claim 10 wherein the plurality of prisms are spaced about 0.51 millimeters apart.

12. The luminaire of claim 10 wherein the plurality of prisms are spaced apart in the range of between about 0.025 and 3.175 millimeters.

13. The luminaire of claim 7 wherein each of the plurality of prisms adjacent the light guide has an included angle in the range of between about 35 and 45 degrees.

14. The luminaire of claim 7 wherein the longitudinal axis is tipped relative to a horizontal plane.

15. The luminaire of claim 7 wherein the light guide is curved.

16. A luminaire comprising:

a light source; and a light guide that receives light radiating from the light source, the light guide including a plurality of prisms for redirecting the light from the light source substantially perpendicular to a longitudinal axis of the light guide, the prisms being formed from a single sheet of material into an integral tube, each prism having an included angle that is substantially uniform along a peak of each prism, the included angle of each prism varying as a function of the distance from the light source.

17. The luminaire of claim 16 further comprising a plurality of prisms adjacent the light source that control the spreading of light along the longitudinal axis of the light guide.

18. The luminaire of claim 16 wherein the sheet of material includes bending grooves for forming a U-shaped tube.

19. The luminaire of claim 18 wherein the U-shaped tube includes a reflective surface on an inside, end surface.

20. The luminaire of claim 16 wherein the light guide includes polycarbonate or acrylic.

21. The luminaire of claim 16 wherein the plurality of prisms are molded, embossed, or cast into the light guide.

22. The luminaire of claim 16 wherein the included angle varies stepwise or continuously.

23. The luminaire of claim 16 wherein the plurality of prisms are formed on a top surface of the light guide and on a bottom surface of the light guide.

24. The luminaire of claim 16 wherein the plurality of prisms include linear prisms.

25. The luminaire of claim 24 wherein the linear prisms are saw-toothed, polygon-shaped, curved, or have curved tips or valleys.

26. The luminaire of claim 24 wherein the linear prisms include flats.

27. The luminaire of claim 16 further comprising a redirecting device adjacent the light source for redirecting light rays into the light guide.

28. The luminaire of claim 16 wherein the tube is U-shaped, rectangular-shaped, polygon-shaped, or triangular-shaped.

29. The luminaire of claim 16 wherein the light guide includes at least one curved portion.

30. A method of redirecting light comprising:

providing a light source;

redirecting light from the light source in a predetermined direction with a plurality of prisms, each prism having an included angle that is substantially uniform along a peak of each prism, the included angle of each prism varying as a function of the distance from the light source; and redirecting light from the light source toward the plurality of prisms.

31. The method of claim 30 wherein the prisms include linear prisms, further comprising the step of configuring the linear prisms to form a curve.

32. A luminaire comprising:

a light source;

a light guide that receives light radiating from the light source, the light guide being curved; and a plurality of prisms adjacent the light guide for redirecting the light from the light guide in a predetermined direction, each prism having an included angle that is substantially uniform along a longitudinal axis thereof, the included angle of each prism varying as a function of the distance from the light source.

33. The luminaire of claim 32 wherein the plurality of prisms include linear prisms.

34. The luminaire of claim 33 wherein the linear prisms are saw-toothed, polygon-shaped, curved, or have curved tips or valleys.

35. The luminaire of claim 33 wherein the linear prisms include flats.

* * * * *